US010816649B1

(12) United States Patent
Keyser et al.

(10) Patent No.: US 10,816,649 B1
(45) Date of Patent: Oct. 27, 2020

(54) TEMPORALLY MULTIPLEXED LADAR POLARIMETER

(71) Applicant: Government of the United States, as represented by the Secretary of the Air Force, Wright-Patterson AFB, OH (US)

(72) Inventors: Christian Keyser, Shalimar, FL (US); Richard Kenneth Martin, Springboro, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 371 days.

(21) Appl. No.: 15/878,535

(22) Filed: Jan. 24, 2018

Related U.S. Application Data (60) Provisional application No. 62/558,598, filed on Sep. 14, 2017.

(51) Int. Cl.
*G01S 7/00* (2006.01)
*G01S 7/499* (2006.01)
(Continued)

(52) U.S. Cl.
CPC ............... *G01S 7/499* (2013.01); *G01J 4/04* (2013.01); *G01S 7/4802* (2013.01); *G01S 17/88* (2013.01)

(58) Field of Classification Search
USPC ........................................................ 356/5.01
See application file for complete search history.

(56) References Cited

U.S. PATENT DOCUMENTS

| 5,018,153 A | 5/1991 | Chien et al. |
| 5,157,257 A | 10/1992 | Geiger |

(Continued)

FOREIGN PATENT DOCUMENTS

| WO | WO2004102225 | 11/2004 |
| WO | WO2014150447 | 9/2014 |

(Continued)

OTHER PUBLICATIONS

Azzam, R.M.A., "Stokes-vector and Mueller-matrix polarimetry," Journal of the Optical Socieity of America, vol. 33, No. 7, Jul. 2016.
(Continued)

*Primary Examiner* — James R Hulka
(74) *Attorney, Agent, or Firm* — AFMCLO/JAZ; David Franklin (57) ABSTRACT

In a polarimeter, a polarization modulator changes a polarization phase of an output optical pulse with a modulation function that varies in time over the duration of the optical pulse. A static polarization state analyzer, which includes a one or more static polarization component analyzers and detectors, receives the modulated optical pulse after interaction with a target medium and provides time varying intensities of the polarization components of the received pulse. A signal processing module determines a polarization property of the target medium, such as a Mueller matrix, dependent upon time varied intensities over the duration of the received optical pulse. A time-division optical multiplexer may be used to combine the outputs from multiple static polarization component analyzers to form a single time-multiplexed signal comprising a plurality of optical pulses that are separated in time and passed to a single photo-detector.

25 Claims, 4 Drawing Sheets

(51) Int. Cl.
*G01J 4/04* (2006.01)
*G01S 17/88* (2006.01)
*G01S 7/48* (2006.01)

(56) References Cited

U.S. PATENT DOCUMENTS

| | | | |
|---|---|---|---|
| 5,231,405 A | 7/1993 | Riza | |
| 5,317,376 A | 5/1994 | Amzajerdian et al. | |
| 5,337,146 A | 8/1994 | Azzam | |
| 5,457,536 A | 10/1995 | Kornfield et al. | |
| 5,687,721 A * | 11/1997 | Kuhls | A61B 5/14558 |
| | | | 356/364 |
| 5,956,147 A | 9/1999 | Jellison, Jr. et al. | |
| 6,060,710 A | 5/2000 | Carrieri et al. | |
| 6,184,984 B1 | 2/2001 | Lee et al. | |
| 6,389,408 B1 | 5/2002 | Carrieri | |
| 6,674,532 B2 * | 1/2004 | VanDelden | G01J 4/04 |
| | | | 356/491 |
| 6,744,509 B2 | 6/2004 | Davis et al. | |
| 6,816,261 B2 * | 11/2004 | Patel | G01J 3/447 |
| | | | 356/364 |
| 6,909,509 B2 | 6/2005 | De Groot | |
| 7,075,649 B1 * | 7/2006 | Johs | G01N 21/211 |
| | | | 356/369 |
| 7,084,977 B2 | 8/2006 | Nomura | |
| 7,218,298 B2 | 5/2007 | Yamazaki et al. | |
| 7,339,670 B2 | 3/2008 | Carrig et al. | |
| 7,349,094 B2 | 3/2008 | Harris et al. | |
| 7,492,455 B1 * | 2/2009 | Johs | G01J 3/02 |
| | | | 356/364 |
| 7,535,566 B1 * | 5/2009 | Johs | G01J 3/02 |
| | | | 356/364 |
| 7,679,726 B2 | 3/2010 | Yamaguchi | |
| 7,737,399 B1 | 6/2010 | Carrieri et al. | |
| 7,773,219 B2 | 8/2010 | Czege et al. | |
| 7,808,637 B2 | 10/2010 | Smith | |
| 8,115,925 B1 | 2/2012 | Mathur et al. | |
| 8,164,742 B1 | 4/2012 | Carrieri et al. | |
| 8,212,995 B2 | 7/2012 | Koehler et al. | |
| 8,325,340 B2 | 12/2012 | Smith | |
| 8,427,645 B2 | 4/2013 | Vagos et al. | |
| 8,988,754 B2 | 3/2015 | Sun et al. | |
| 9,007,569 B2 | 4/2015 | Amzajerdian et al. | |
| 9,491,587 B2 | 11/2016 | Mitchell et al. | |
| 9,566,898 B2 | 2/2017 | Langkabel et al. | |
| 9,702,975 B2 | 7/2017 | Brinkmeyer et al. | |
| 9,784,840 B2 * | 10/2017 | Pedersen | G01S 17/95 |
| 10,094,928 B2 * | 10/2018 | Josset | G01S 17/95 |
| 10,197,668 B2 * | 2/2019 | Smith | G01S 17/42 |
| 10,353,054 B2 * | 7/2019 | Hinokuma | G01S 7/4812 |
| 2002/0135774 A1 | 9/2002 | De Groot | G01B 11/306 |
| | | | 356/497 |
| 2003/0067602 A1 * | 4/2003 | Patel | G01J 3/447 |
| | | | 356/369 |
| 2003/0103214 A1 * | 6/2003 | VanDelden | G01J 4/04 |
| | | | 356/491 |
| 2003/0189410 A1 * | 10/2003 | Yamazaki | G09G 3/3266 |
| | | | 315/169.1 |
| 2004/0033616 A1 * | 2/2004 | Le | G01N 21/4795 |
| | | | 436/164 |
| 2004/0036876 A1 * | 2/2004 | Davis | G01J 4/00 |
| | | | 356/367 |
| 2005/0002032 A1 | 1/2005 | Wijntjes et al. | |
| 2005/0105087 A1 * | 5/2005 | Nomura | G03F 7/70125 |
| | | | 356/364 |
| 2006/0114447 A1 * | 6/2006 | Harris | G01J 3/42 |
| | | | 356/4.01 |
| 2006/0262290 A1 * | 11/2006 | Yamaguchi | G01S 7/4817 |
| | | | 356/4.01 |
| 2007/0024849 A1 * | 2/2007 | Carrig | G01N 21/21 |
| | | | 356/337 |
| 2007/0097350 A1 | 5/2007 | Halama | |
| 2009/0033938 A1 * | 2/2009 | Czege | G01J 4/04 |
| | | | 356/369 |
| 2009/0296088 A1 * | 12/2009 | Smith | G01N 21/23 |
| | | | 356/367 |
| 2009/0296089 A1 * | 12/2009 | Smith | G01B 11/0641 |
| | | | 356/367 |
| 2011/0228249 A1 * | 9/2011 | Koehler | G01S 7/481 |
| | | | 356/4.01 |
| 2012/0026497 A1 * | 2/2012 | Mathur | G01N 15/0205 |
| | | | 356/342 |
| 2012/0176618 A1 * | 7/2012 | Vagos | G01N 21/211 |
| | | | 356/369 |
| 2013/0127341 A1 * | 5/2013 | Langkabel | B60Q 1/085 |
| | | | 315/79 |
| 2013/0322873 A1 * | 12/2013 | Stevenson | H04B 10/07 |
| | | | 398/25 |
| 2014/0036252 A1 * | 2/2014 | Amzajerdian | G01S 17/875 |
| | | | 356/28 |
| 2014/0192394 A1 * | 7/2014 | Sun | G02F 1/0147 |
| | | | 359/289 |
| 2015/0055115 A1 | 2/2015 | Pedersen et al. | |
| 2015/0301178 A1 * | 10/2015 | Brinkmeyer | G01S 7/4818 |
| | | | 250/227.23 |
| 2016/0209496 A1 | 7/2016 | Smith | |
| 2016/0277901 A1 * | 9/2016 | Mitchell | H04W 24/04 |
| 2016/0310002 A1 * | 10/2016 | Tomatsu | A61B 3/0025 |
| 2017/0242100 A1 | 8/2017 | Hinokuma et al. | |
| 2017/0242127 A1 | 8/2017 | Josset et al. | |

FOREIGN PATENT DOCUMENTS

| | | |
|---|---|---|
| WO | WO2015022148 | 2/2015 |
| WO | WO2015044370 | 4/2015 |
| WO | WO2017149526 | 9/2017 |

OTHER PUBLICATIONS

Azzam, R.M.A., "Photopolarimetric measurement of the Mueller matrix by Fourier analysis of a single detected signal," Optics Letter, vol. 2, No. 6, Jun. 1978.

Goldstein, Dennis H., "Monostatic Mueller Matrix Laser Reflectometer," AFRL-MN-EG-TP-2005-7407, Air Force Research Laboratory, Aug. 2005.

Goldstein, Dennis H., "Mueller matrix dual-rotating retarder polarimeter," Applied Optics, vol. 31, No. 31, Nov. 1, 1992.

Lopez-Tellez et al., "Mueller-matrix polarimeter using analysis of the nonlinear voltage-retardance relationship for liquid-crystal variable retarders," Applied Optics, vol. 53, No. 24, Aug. 20, 2014.

* cited by examiner

TEMPORALLY MULTIPLEXED LADAR POLARIMETER

CROSS-REFERENCE TO RELATED APPLICATIONS

The application claims the benefit of U.S. Provisional Application No. 62/558,598 filed Sep. 14, 2017, the entire content of which is hereby incorporated by reference.

STATEMENT OF GOVERNMENT INTEREST

The invention described herein may be manufactured, used and licensed by or for the Government of the United States for all governmental purposes without the payment of any royalty.

FIELD OF THE INVENTION

The present disclosure relates generally to the field of LADAR (laser detection and ranging), and specifically to an improved LADAR polarimeter.

BACKGROUND

LADAR (Laser Detection and Ranging) is used in defense, meteorology, vehicle automation, robotics, machine vision, chemical analysis, manufacturing metrology and other applications. In addition to detection and ranging, LADAR may be used to generate an image of a surface or object by scanning. A LADAR system generates a laser beam and senses the light after interaction with an object. The light may be scattered from, reflected from, or transmitted through the object. The relationship between the generated light and the returned light (whether scattered, reflected, or transmitted) may be used to characterize the object.

One characteristic of an object is the way in which the polarization of the incident light is altered. A LADAR system that detects polarization of the light after interaction with the object is called a LADAR polarimeter. Herein, the object or surface that interacts with the laser beam will be referred to as the 'target'. A traditional LADAR polarimeter makes multiple serial measurements. Before each measurement, the system adjusts a polarization state generator (PSG) such that a laser beam pulse passing through the PSG will be converted to a particular polarization state before being transmitted to the target. In parallel, a polarization state analyzer (PSA) is adjusted to measure the target return signal, which is in some other polarization state. This process is completed multiple times to fully characterize the target.

A beam may be characterized by a Stokes vector, discussed below. The elements of the Stokes vector describe energy fluxes of specific polarizations and can completely quantify the associated time-averaged electric fields. The optical properties of a target may be characterized by a Mueller Matrix, which describes how a Stokes vector of a beam is altered by interaction with the target. The Mueller matrix describes optical properties of the target medium. In some applications, the Mueller matrix may be used to identify the material. The matrix can vary dependent upon the wavelength and angle of incidence of the beam. A Mueller matrix contains 16 elements, so a conventional polarimeter requires multiple measurements to be made, each with a different polarization, to enable the 16 elements of the Mueller matrix to be determined.

The need to collect multiple measurements is undesirable since it increases the time taken to complete an image scan.

Similarly, the Mueller matrix can be determined from an extended-time measurement. For example, polarizing and analyzing optics may each be modulated by synchronously rotating two quarter-wave retarders, rotating at different speeds. The resulting signal is analyzed using discrete Fourier transform (DFT).

There is unmet need in the art for a polarimeter that is capable of measuring a Mueller matrix from a single, short pulse. In addition, it would be advantageous, from a cost and reliability viewpoint, for a polarimeter to have a minimum number of moving parts.

BRIEF SUMMARY

The improved LADAR polarimeter disclosed herein will be described in connection with certain embodiments. However, it is understood that it is not limited to these embodiments. To the contrary, the present invention includes all alternatives, modifications and equivalents within the scope of the embodiments disclosed. The improved LADAR polarimeter enables polarization properties, such as a Mueller matrix, of an object or medium to be sensed using a single, short duration optical pulse.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings provide visual representations which will be used to more fully describe various representative embodiments. They can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

The various methods, systems, apparatus, and devices described herein generally provide for an improved LADAR polarimeter. Embodiments of the present disclosure are directed to a LADAR polarimeter than enables characterization of the optical properties of a target medium from an optical pulse. This is achieved by dynamically varying the polarization of the light within the time envelope of the transmitted pulse in a defined manner. The optical characteristics of the target medium are determined using the known variation of the transmitted pulse and the measured variation of the detected pulse. The system is improved further by use of static PSAs that are time multiplexed to a single detector, thereby providing a potential for reductions in the size, cost, and weight of the system.

In one embodiment, a polarimeter includes a polarization modulator, a polarization state analyzer and a signal processing module. The polarization modulator is configured to change a polarization phase of an optical pulse in accordance with a modulation function that varies in time over the duration of the optical pulse to provide a modulated optical pulse. The polarization state analyzer comprises one or more static polarization component analyzers configured to receive the modulated optical pulse after interaction with a target medium and provide polarization components of the modulated optical pulse, and one or more optical detectors configured to sense time varying intensities of the polarization components. The signal processing module is configured to determine a polarization property of the target medium dependent upon time variations in the sensed intensities of the polarization components over the duration of the received polarization modulated optical pulse.

In a further embodiment, the polarization state analyzer provides multiple polarization component optical pulses of the modulated optical pulse and a time-division optical multiplexer that is configured to combine the polarization component optical pulses to form a single time-multiplexed signal comprising a plurality of optical pulses that are separated in time. An optical detector senses the time-multiplexed signal and an analog-to-digital converter converts the sensed time-multiplexed signal to a digital signal. The signal processing module is configured to determine a polarization property of the target medium dependent upon the digital signal and upon the polarization phase of the modulated optical pulse.

A method is provided for sensing polarization properties of a target medium. An optical pulse that is outgoing from the target medium is received at the polarimeter, the received optical pulse resulting from interaction of a transmitted optical pulse with the target medium. The received optical pulse through static polarizers to provide a plurality of polarization components, the intensities of which are sensed over a duration of the received optical pulse. The polarization properties of the target medium dependent upon time variations of the sensed intensities of the plurality of polarization components over the duration of the received optical pulse. A polarization phase of the transmitted optical pulse is modulated in accordance with a modulation function that varies in time over the duration of the transmitted optical pulse. The polarization properties of the target medium are also dependent upon the polarization phase of the transmitted optical pulse.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar, or corresponding parts in the several views of the drawings.

The term "configured" or the like may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

A method and apparatus for sensing a polarization property, such as a Mueller matrix, of a target or scene of interest are disclosed in which a polarization phase of a single optical pulse is modulated in accordance with a modulation function that varies in time over the duration of the optical pulse to provide a polarization modulated optical pulse. After interaction with the target medium, the polarization modulated optical pulse is separated into a number of polarization components and time varying intensities of the polarization components are sensed. The polarization property of the target or scene of interest is determined dependent upon the sensed time varying intensities of the polarization components over the duration of the single polarization modulated optical pulse.

Multiple modulated optical pulses may be scanned across at least a portion of the target medium.

Herein, the term 'target medium' will be used to denote the entity or entities, such as a target or scene of interest, with which the optical pulse interacts to cause the change in its polarization state.

The time varying intensities of the polarization components may be sensed and then sampled by an analog-to-digital converter to provide digitized intensities from which the polarization property of the target medium is determined.

The optical pulse may be a laser beam pulse, for example. The polarization phase of the laser beam pulse is modulated by passing the laser beam pulse through an electro-optic polarization phase retarder; and supplying a control voltage to the electro-optic polarization retarder, where the control voltage varies in time over the duration of the laser beam pulse. In one embodiment, a short pulse is used, having a duration of several nanoseconds. For example, the duration may be less than 100 nanoseconds. The electro-optic polarization phase retarder may be a single Pockels cell, for example.

The control voltage supplied to the electro-optic polarization phase retarder is varied in time over the duration of the optical pulse. Full wave voltage is defined as the voltage that, when applied, causes the phase to change by 360° or one full cycle of phase. The control voltage may be varied from 0 Volts to several or more full wave voltages so that the phase is varied by multiple cycles of phase.

The polarization modulated pulse may be split into first, second and third split beams after interaction with the target medium. The first split beam is passed through a first polarizer to provide the horizontal and vertical polarization components of the received polarization modulated optical pulse over the duration of the received modulated optical pulse. The second split beam is passed through a second polarizer to provide the left-diagonal and right-diagonal polarization components of the received modulated optical pulse over the duration of the received polarization modulated optical pulse. The third split beam is passed through a third polarizer to provide the left-circular and right-circular polarization components of the received polarization modulated optical pulse over the duration of the received modulated optical pulse.

The disclosed method and apparatus take account of the transit time of the pulse. This enables the Mueller matrix of a sample to be measured at long range (meters or kilometers, for example).

In one embodiment, the received modulated optical pulses from multiple polarization analyzers are combined to form a single time-multiplexed signal comprising a sequence of optical pulses that are separated in time. In this embodiment, the polarization components can all be sensed by a single photo-detector.

Figure 1:
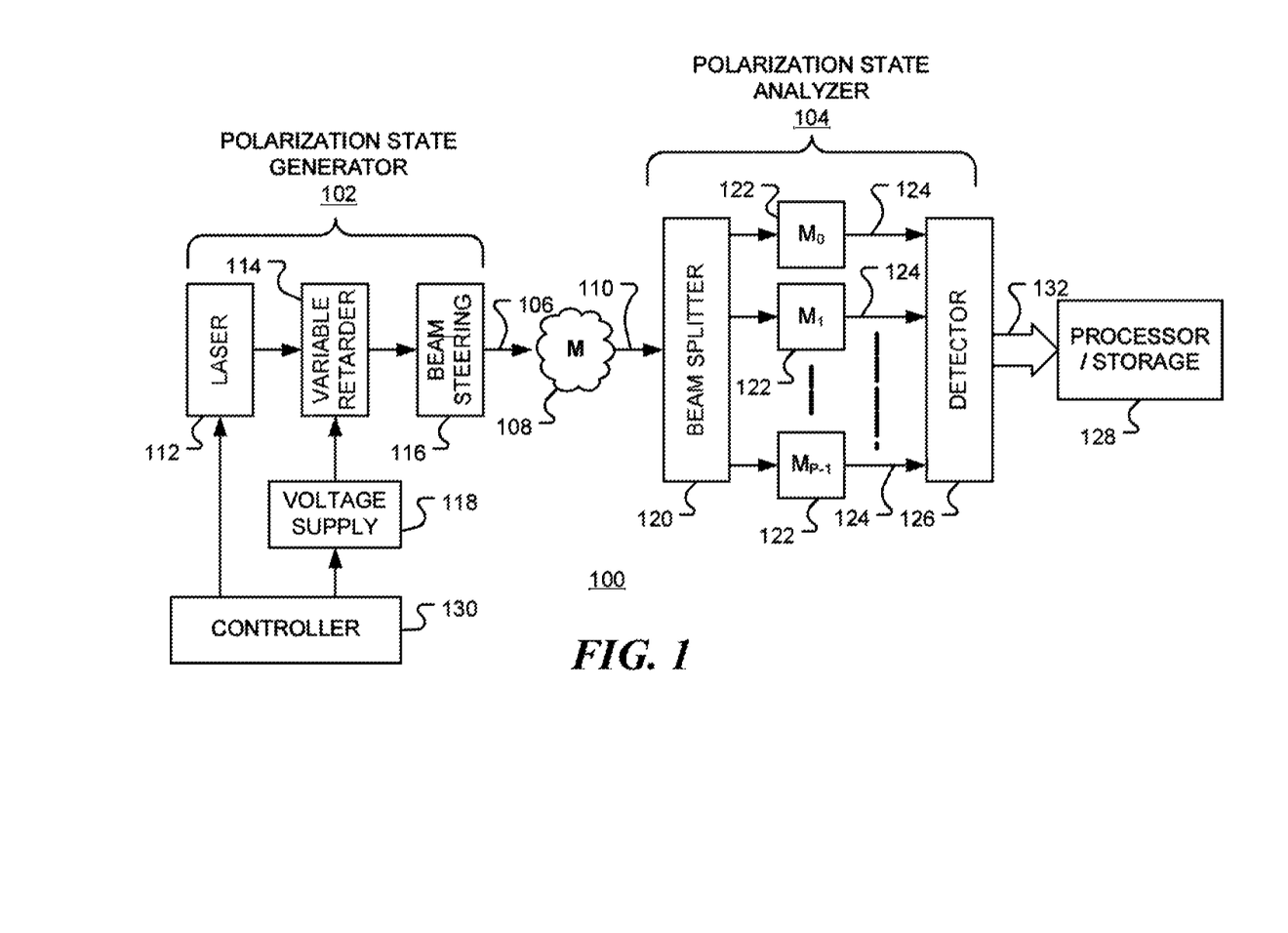
FIG. 1 is a block diagram of a polarimeter, in accordance with a representative embodiment.

Referring now to the drawings, FIG. 1 is a block diagram of a polarimeter 100, in accordance with a representative embodiment. Polarimeter 100 comprises a polarization state generator (PSG) 102 that generates and transmits an optical pulse, such as laser beam 106, with a known polarization state and a polarization state analyzer (PSA) 104 that receives an optical pulse, such as laser beam 110, and detects the polarization state of a received optical pulse. In operation, laser beam 106 is incident on target medium 108, the optical properties of which are described by Mueller matrix M. Incident laser beam 106 interacts with the target medium and results in outgoing laser beam 110. The outgoing beam 110 may be reflected from, scattered by, or transmitted through target medium 108. Polarization state generator (PSG) 102 comprises a laser emitter 112, polarization modulator 114, and beam steering element 116. Polarization modulator 114 may be a voltage controlled polarization phase retarder controlled by voltage supply 118, for example. In one embodiment, a control voltage, such as a monotonic ramp with time constant $\beta=1/(10\ ns)$, is applied to the phase retarder. The peak voltage is selected to provide 180° or greater rotation of the polarization. The voltage may be of the order of 1 kV, for example. Further, the transmitted pulse 106 may be an amplitude and polarization modulated signal wavelength beam or a multispectral beam.

Polarization state analyzer (PSA) 104 comprises beam splitter 120 that receives the outgoing laser beam 110, a plurality of polarization component analyzers 122 that produce polarization component beams 124 in response to received components of the split beam, and intensity detector 126 that receives the polarization component beams 124. The polarization component analyzers 122 are static analyzers in that their characteristics do not vary in time. The output from the detector 126 is passed to processor and/or storage device 128. Beam splitter 120 may be, for example, a dichroic (wavelength selective) mirror, a beam splitter cube, a fiber-optic beam splitter, a half-silvered mirror, or a diffraction grating or combinations thereof.

In accordance with an embodiment, two beam splitters are used to provide three output beams. Each output beam is directed to a polarization analyzer to provide six polarization component beams. This enables measurement of the full Mueller matrix. In some case, however, fewer polarization component beams may be provided. For the case of three beam splitters, the first split beam is sent to a horizontal-vertical linear polarization analyzer, the second split beam is sent to a left-right diagonal linear polarization analyzer, and the third split beam is sent to a left-right circular polarization analyzer. Measurement of all the time dependent beams from the analyzers enables estimation of the full Mueller matrix.

Controller 130 is provided to synchronize the generation and polarization of the transmitted pulse 106 with the detection of the received pulse 110.

The polarization state of the incident beam 106 is described by a Stokes vector defined as $$s=[I_{total}, I_0, I_{90}, I_{45}, I_{135}, I_L, I_R]^T, \quad (1)$$

where $I_{total}$ is the total intensity, including any non-polarized light, $I_0$ and $I_{90}$ are, respectively, the horizontal (0°) and vertical (90°) polarized light intensities, $I_{45}$ and $I_{135}$ are, respectively, the 45° and 135° polarized light intensities, and $I_L$ and $I_R$ are, respectively, the left and right circularly polarized light intensities.

When incident beam 106 interacts with target medium 108, the polarization state of the beam may be altered. The modification of the Stokes vector after interaction with the medium is described by a 4×4 Mueller matrix M, with components $M_{ij}$. The Stokes vector $s_{out}$ of outgoing pulse 110 from target medium 108 is related to the Stokes vector $s_{in}$ of incoming pulse 106 by $$s_{out} = M s_{in}. \quad (2)$$

Written in component form, $$\begin{bmatrix} s_{0,out} \\ s_{1,out} \\ s_{2,out} \\ s_{3,out} \end{bmatrix} = \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix} \begin{bmatrix} s_{0,in} \\ s_{1,in} \\ s_{2,in} \\ s_{3,in} \end{bmatrix}. \quad (3)$$

Polarimeter state analyzer 104 is used to measure Stokes vectors outgoing from the material. The Mueller matrix of the target medium 108 may be estimated from a sequence of incident Stokes vectors together with the corresponding sequence of outgoing Stokes vectors.

Polarization State Generator.

In accordance with a first aspect of the disclosure, the polarization of the incident pulse 106 is varied dynamically (modulated) within the duration the pulse. This may be done, for example, using an electro-optical phase modulator or retarder 114, for which the polarization shift is proportional to an applied voltage from voltage supply 118. The polarization modulation may be achieved using an electro-optic Pockels cell, a voltage-controlled liquid-crystal cell, a photo-elastic (PE) modulator or a Faraday cell, for example. A polarization linear retarder varies the orientation of the polarization. In general, the orientation, ellipticity and/or handedness (chirality) of the polarization may be varied.

For example, for an H-polarized laser beam pulse of power P(t) and an electro-optic retarder 114 with crystal axes at $\alpha=45°$ to incident linear polarization, the transmitter Stokes vector is $$s_{tx}(t) = P(t) \begin{bmatrix} 1 \\ \cos^2 2\alpha + \sin^2 2\alpha \cdot \cos\psi(t) \\ \sin 4\alpha \cdot \sin^2(\psi(t)/2) \\ \sin 2\alpha \cdot \sin\psi(t) \end{bmatrix} = P(t) \begin{bmatrix} 1 \\ \cos\psi(t) \\ 0 \\ \sin\psi(t) \end{bmatrix}, \quad (4)$$

where α is the angle to the fast axis of the crystal and ψ is the phase difference between the fast and slow axes of the crystal.

Figure 2:
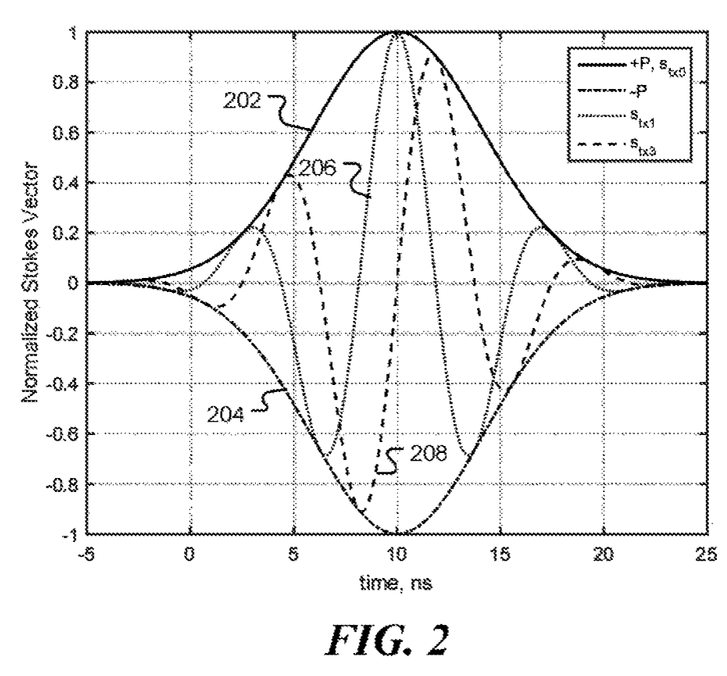
FIG. 2 is a graph showing temporal variations in polarization components of a laser beam pulse, in accordance with a representative embodiment.

FIG. 2 is a graph showing temporal variations in polarization components of a laser beam pulse, in accordance with a representative embodiment. The graph shows the pulse upper envelope and intensity P(t), 202, the lower envelope −P(t) 204, the Stokes component $s_{tx,1}(t)$ 206 and the Stokes component $s_{tx,3}(t)$ 208, all as a function of time, t. Thus, it can be seen that the polarization state varies with time over the duration of the pulse. The pulse may be a short duration pulse. For example, the duration may be less than 100 ms, less than 100 ns, or less than 10 ns. This enables dynamically changing targets to be sensed, for example. In particular, the duration of the pulse may be of the same order as the round trip propagation time from the transmitter or generator 102 back to the receiver or analyzer 104.

Target Medium Response.

The response characteristic of target medium 108 is described by Mueller matrix M. The outgoing Stokes vector $s_{out}(t)$ at time t is related to the incident Stokes vector $s_{in}(t)$ by $s_{out}(t) = Ms_{in}(t-\tau)$, where $\tau = R/c$ is the round trip time from the transmitter 102 to the target medium 108 and back to the receiver 104.

Polarization State Analyzer.

An analyzer may be composed of a quarter wave plate and a linear polarizer whose relative orientations are varied to sense different polarization states. One embodiment of the present disclosure uses a static analyzer comprising two linear polarizers at different angles and a third analyzer, which is a circular polarization analyzer, comprises a quarter wave plate and a linear polarizer.

Channel p of analyzer 104 senses polarization component p of the received pulse 110. The overall response characteristic of a static analyzer for channel p at range R is denoted as $t^T(R, p)$. An analyzer comprises a static polarization analyzer 122 with constant Mueller matrix $M_p^{rx}$, and an intensity detector 126. The polarization analyzer may be an absorptive analyzer with a single output or a beam-splitting polarization analyzer with two outputs, for example. The intensity detector 126 selects the first (total Intensity) component of the Stokes vector of the component beam and has response characteristic $Du_0^T = D[1\ 0\ 0\ 0]$, where D is the detector responsivity.

In one embodiment, the response characteristic of channel p of the polarimeter is denoted as $$t^T(R,p) = R^{-2} \cdot A(R) \cdot T_{rx}(p) \cdot Du_0^T M_p^{rx} = k(R,p) u_0^T M_p^{rx}, \quad (5)$$

where A(R) is the atmospheric attenuation at range R, $T_{tx}(p)$ is the transmissivity of the transmitter optics as a function of polarization p, $T_{rx}(p)$ is the transmissivity of the receiver optics as a function of channel index p, and $k(R,p) = R^{-2} \cdot A(R) \cdot T_{tx}(p) \cdot T_{rx}(p) \cdot D$ is a scale factor that depends on the range R and the polarization p. This denotes the response in free air and may be determined by calibration, for example.

The response signal of channel p of the polarization state analyzer when no target medium is present is $$y_p(t+\tau_0) = t^T(R,p) s_{tx}(t). \quad (6)$$

When the target is a perfect reflector $$y_p(t+\tau_0) = t^T(R,p) \text{diag}\{1,1,-1,-1\} s_{tx}(t), \quad (7)$$

where the 'diag' operation denotes the diagonal matrix constructed from the arguments.

This enables the response characteristic of polarimeter to be calibrated. For example, a least squares estimate for channel p is $$\hat{t}^T(R,p) = \langle y_p(t+\tau_0) s_{tx}^T(t) \rangle \langle s_{tx}(t) s_{tx}^T(t) \rangle. \quad (8)$$

The delay $\tau_0$ may be estimated by finding the value that produces the best fit of the data.

The response signal from channel p of the polarization state analyzer, which provides an estimate of polarization component p in the received pulse, is $$y_p(t) = t^T(R,p) s_{out}(t) = t^T(R,p) M s_{tx}(t-\tau). \quad (9)$$

Collecting over P polarization components gives an intensity vector $$y(t) = T^T(R) M s_{tx}(t-\tau), \quad (10)$$

where $$y = \begin{bmatrix} y_0 \\ y_1 \\ \vdots \\ y_{P-1} \end{bmatrix}, \quad T^T(R) = \begin{bmatrix} t^T(R, 0) \\ t^T(R, 1) \\ \vdots \\ t^T(R, P-1) \end{bmatrix}. \quad (11)$$

The matrix T describes the response of polarization state analyzer 104. The intensity vector y is shown as 132 in FIG. 1. The intensity vector 132 can be written as $$y(t) = T^T M S_{tx}(t-\tau) = (S_{tx}(t-\tau) \otimes T) \text{vec}(M) \quad (12)$$
$$= (T \otimes S_{tx}(t-\tau))^T \text{vec}(M^T),$$

or $$y(t) = H(t-\tau)x, \quad (13)$$

where $H(t-\tau) = (T \otimes S_{tx}(t-\tau\tau))^T$, ⊗ is the Kronecker product, and $x = \text{vec}(M^T)$ is the row-wise vectorization of the Mueller matrix M. In practice, the measurements will be corrupted by some level of noise. Assuming an additive noise vector v, the measurement vector can be written as $$y(t) = H(t-\tau)x + v. \quad (14)$$

This equation describes the relationship between the intensity vector and the polarization properties of the target medium.

Example Polarization State Analyzers.

In one embodiment, two polarization analyzers are used, yielding four polarization components and Mueller matrices:

$$M_H^{rx} = \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix}, M_V^{rx} = \frac{1}{2}\begin{bmatrix} 1 & -1 & 0 & 0 \\ -1 & 1 & 0 & 0 \\ 0 & 0 & 0 & 0 \\ 0 & 0 & 0 & 0 \end{bmatrix}, \quad (15)$$

$$M_R^{rx} = \frac{1}{2}\begin{bmatrix} 1 & 0 & 0 & 1 \\ 1 & 0 & 0 & 1 \\ 0 & 0 & 0 & 0 \\ 0 & 0 & 0 & 0 \end{bmatrix}, M_L^{rx} = \frac{1}{2}\begin{bmatrix} 1 & 0 & 0 & -1 \\ 1 & 0 & 0 & -1 \\ 0 & 0 & 0 & 0 \\ 0 & 0 & 0 & 0 \end{bmatrix}.$$

The matrices $M_H^{rx}$ and $M_V^{rx}$ are the Mueller matrices for a horizontal and vertical polarizer/analyzer, respectively. $M_R^{rx}$ and $M_L^{rx}$ are Mueller matrices for right and left circular polarization analyzers composed of a quarter wave plate followed by a linear polarizer at different angular orientations. However, other analyzers may be used, such as elliptical analyzers, resulting in different Mueller matrices in equation (15).

For a polarization state analyzer with channels described by the matrices in equation (15), the matrix T describing the overall response of the polarization state analyzer is given by $$T^T(R) = \frac{1}{2}\begin{bmatrix} k(R,H) & k(R,H) & 0 & 0 \\ k(R,V) & -k(R,V) & 0 & 0 \\ k(R,R) & 0 & 0 & k(R,R) \\ k(R,L) & 0 & 0 & -k(R,L) \end{bmatrix}. \quad (16)$$

The resulting intensity signals from the channels of polarization state analyzer are:

$$y_{rx,H}(t) = \frac{1}{4}k(R,p)\sum_{j=0}^{3} s_{tx,j}(t-\tau)(M_{0j}+M_{1j}) \quad (17)$$

$$y_{rx,V}(t) = \frac{1}{4}k(R,p)\sum_{j=0}^{3} s_{tx,j}(t-\tau)(M_{0j}-M_{1j})$$

$$y_{rx,R}(t) = \frac{1}{4}k(R,p)\sum_{j=0}^{3} s_{tx,j}(t-\tau)(M_{0j}+M_{3j})$$

$$y_{rx,L}(t) = \frac{1}{4}k(R,p)\sum_{j=0}^{3} s_{tx,j}(t-\tau)(M_{0j}-M_{3j})$$

Similar relationships may be determined when other combinations of polarization component analyzers are used.

Determination of the Polarization Properties of the Target Medium

When the transmission Stokes vector $s_{tx}(t-\tau)$ is time varying over the duration of the pulse, the vector x (which is the vectorization of the Mueller matrix) can be estimated in a least squares sense as, for example, $$x = \left\langle H^T(t-\tau)R^{-1}H(t-\tau)\right\rangle^{-1}\left\langle H^T(t-\tau)R^{-1}y(t)\right\rangle, \quad (18)$$

where the angled brackets indicate a time average or integration over the duration of the pulse and R is the autocorrelation matrix of the noise vector v. The elements of vector x correspond to elements of the Mueller matrix. In equation (18), the matrix inverses may be replaced by pseudo-inverses when the matrices are poorly conditioned or singular. For example, $R^{-1}$ may be replaced by a pseudo-inverse $R^\dagger$ when R is poorly conditioned or singular. This solution assumes that the propagation time $\tau$ is known or can be estimated. When $\tau$ is not known, it can be estimated by finding a value that provides the best fit of the model to the data. For example, the propagation time may be estimated as $$\hat{\tau} = \arg\min_\tau \|y - H(\tau)\hat{x}(\tau)\|^2_{R^{-1}} \quad (19)$$

where $$\hat{x}(\hat{\tau}) = \left\langle H^T(t-\hat{\tau})R^{-1}H(t-\hat{\tau})\right\rangle^{-1}\left\langle H^T(t-\hat{\tau})R^{-1}y(t)\right\rangle. \quad (20)$$

In equations 19 and 20, the caret denotes an estimated value and the angled brackets denote the expected value. It is important to note that the matrix $H(t-\hat{\tau})$ is dependent upon the estimate $\hat{\tau}$ of the propagation time and upon the time-variations in the polarization state of the transmitted pulse. In prior techniques, either the polarization state is fixed of the duration of measurement, and therefore independent of time, or the time scale of the time variations (such as produced by a rotating disk) are so large that the propagation delay is neglected. In embodiments of the present disclosure, the duration of the pulse may be of the same order as or less than the propagation time. For example, the duration of the pulse may be between 0.1 times the propagation time and 10 times the propagation time. In this case, greater accuracy is achieved when the propagation delay is taken into account as described above.

The signal from the photodetector or intensity sensor may be sampled and digitized. For example, a pulse for which the full width at half maximum is 10 ns may be detected by a photodetector with bandwidth greater 400 MHz. The detector output may be sampled at a sample rate of 400 MHz or higher (2.5 ns period or shorter) to provide a digital representation of the signal.

Figure 3:
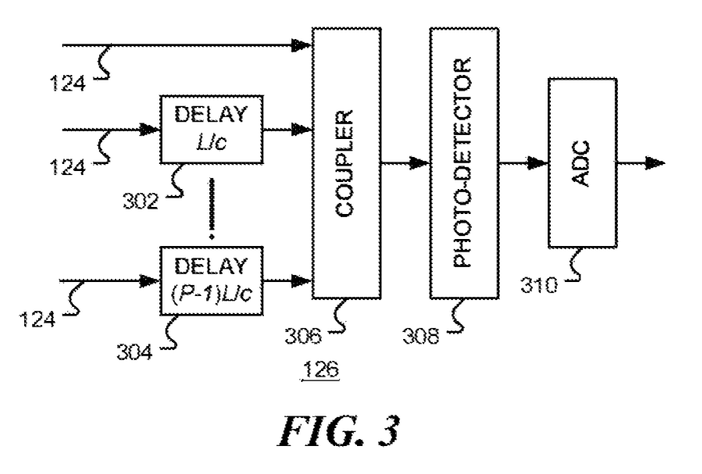
FIG. 3 is a block diagram of a time-division multiplexed detector, in accordance with a representative embodiment.

FIG. 3 is a block diagram of a detector 126 implemented using time-division multiplexing, in accordance with a representative embodiment. In this embodiment, the polarization components 124 of the returned laser pulse are passed to a number of optical delay elements 302 to 304. The delay elements delay the polarization components by successively large amounts. The delay elements may be implemented using optical fibers of different lengths, for example. For a fiber of length L, the time delay is L/c, where c is the speed in the fiber. The delayed polarization components are combined in optical coupler or combiner 306 to form a single combined beam. The fiber length L is selected such the polarization components in the combined beam are separated in time. The combined beam is passed to a single photo-detector 308 that senses the intensity of the combined beam and provides an intensity signal as output. The output from the photo-detector may be passed to an analog-to-digital converter (ADC) 310 to enable digital processing of the intensity sensed by the photodetector. Successive time windows of the sampled intensity signal may be processed to obtain corresponding components of the intensity vector, y.

Figure 4:
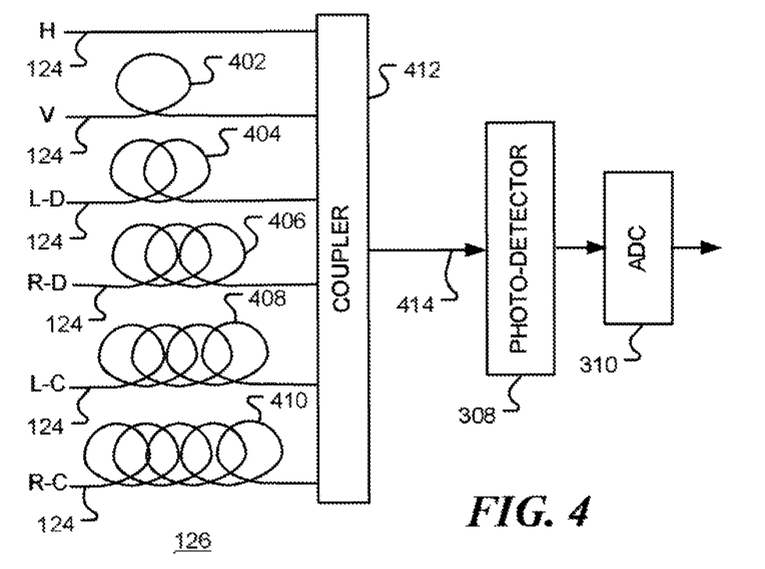
FIG. 4 is a block diagram of a time-division multiplexed detector implemented using optical fiber loops, in accordance with a representative embodiment.

FIG. 4 is a block diagram of a detector 126 for a polarization state analyzer with six polarization components (horizontal (H), vertical (V), left-diagonal (L-D), right-diagonal (R-D), left-circular (L-C), and right-circular (R-C) in this example), in accordance with a further representative embodiment. The detector 126 is implemented using time-division multiplexing, as in FIG. 3. In this embodiment, the polarization components 124 of the returned laser pulse are sequentially delayed in optical fiber loops 402, 404, 406, 408, and 410. The delayed optical signals are combined in coupler 412 to provide a combined, time-multiplexed signal in fiber 414. The combined time-multiplexed signal is passed to single photo-detector 308, and the sensed signal is digitized in ADC 310.

Figure 5:
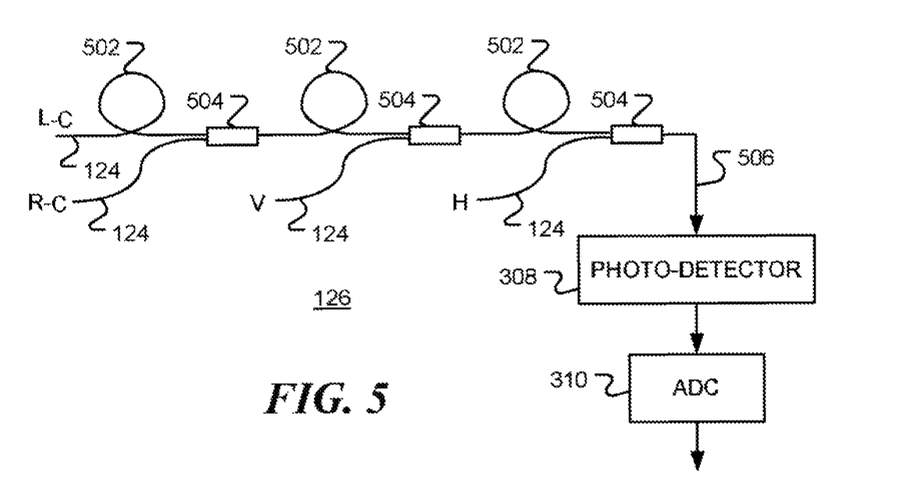
FIG. 5 is a block diagram of a time-division multiplexed detector implemented using optical fiber loops, in accordance with a further representative embodiment.

FIG. 5 is a block diagram of a detector 126 implemented using time-division multiplexing, in accordance with a further representative embodiment. In this embodiment, the polarization components 124 (H, V, R and L in this example) of the returned laser pulse are sequentially delayed in fiber delay loops 502 and combined in couplers 504. The fiber loops provide delay elements. The combined, time-multiplexed beam in optical path 506 is passed to a single photo-detector 308. The output from the photo-detector may be passed to an analog-to-digital converter (ADC) 310 to enable digital processing of the intensity signal from the photo-detector. The approaches shown in FIGS. 3-5 enable a single photo-detector and a single ADC to be used. This, in turn, enables the size and/or cost of polarization state analyzer to be reduced.

Figure 6:
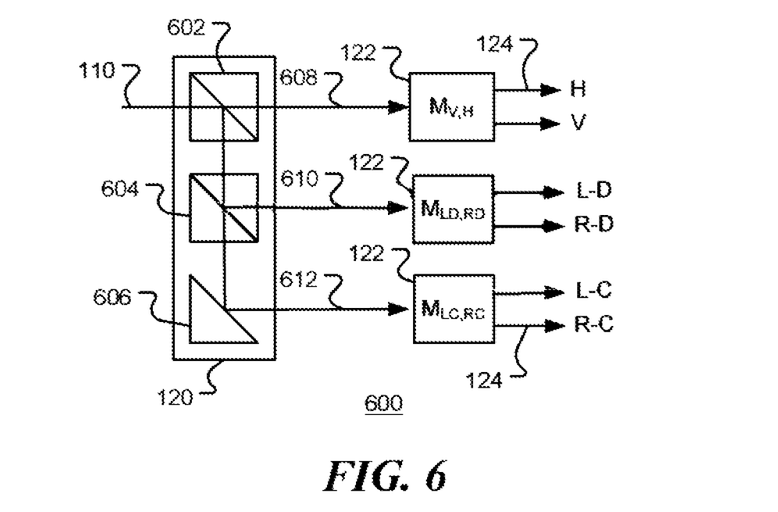
FIG. 6 is a block diagram of a beam splitter and polarization analyzer, in accordance with a representative embodiment.

FIG. 6 is a block diagram of a beam splitter and polarization analyzer, in accordance with a representative embodiment. The apparatus 600 comprises beam splitter 120 and three polarization component analyzers 122. Beam splitter 120 comprises beam splitter cubes 602 and 604 and a mirror 606. Beam splitter cube 602 receives the modulated optical pulse 110 after interaction with the target medium and provides a first split beam 608. Beam splitter cube 604 provides a second split beam 610, and mirror 606 reflects a third split beam 612. As described above, a polarization analyzer may be an absorptive analyzer with a single output or a beam-splitting polarization analyzer with two outputs. In the embodiment shown, beam splitting polarization component analyzers 122 are utilized to provide six polarization components 124. The polarization components in this example are horizontal, vertical, left-diagonal, right-diagonal, left-circular, and right-circular polarization components. The first polarization analyzer receives the first split beam 608 and provides the horizontal and vertical polarization components of the received polarization modulated optical pulse over the duration of the received modulated optical pulse. The second polarization analyzer receives the second split beam 610 and provides the left-diagonal and right-diagonal polarization components. The third polarization analyzer receives the third split beam 612 and provides the left-circular and right-circular polarization components of the received polarization modulated optical pulse over the duration of the received modulated optical pulse. Other combinations may be used without departing from the present disclosure. For example, signals may be measured using a number of static analyzers (2 or 3 for example) to provide polarization components (4 or 6 for example).The example embodiments described above use an electro-optic polarization phase retarder to modulate the polarization phase of a transmitted laser beam pulse. An alternative embodiment uses nonlinear interaction of a laser beam pulse. The time varying amplitude of the pulse along the pulse envelope causes a corresponding time varying phase shift that, in turn, produce a time varying polarization variation along the pulse envelope.

The laser beam pulse has an instantaneous power p(t) that varies in time, and an instantaneous intensity I(t). The laser power can interact with a nonlinear medium to produce a power dependent phase shift, self-phase modulation, given by $\phi(t) = -n_2 I(t) \omega L/c$. When the laser beam pulse is shined into a birefringent nonlinear medium, such as crystal or fiber for example, the laser field will have components E cos θ and E sin θ along the birefringent axes x and y, the birefringence of which are denoted by $n_x$ and $n_y$. The electric field is given by $$\vec{E} = \hat{x}E \cos\theta \ e^{i(kn_x x + \phi_x)} + \hat{y}E \sin\theta \ e^{i(kn_y z + \phi_y)}. \quad (21)$$

The relative phase between the two field components, which determines the polarization, is $$\Delta\phi = k(n_x - n_y)L + (\phi_x - \phi_y) = \quad (22)$$
$$\left(k\Delta n - \frac{n_2 \omega}{c}(I_x(t) - I_y(t))\right)L = \left(k\Delta n - \frac{n_2 \omega}{c}I(t)(\cos^2\theta - \sin^2\theta)\right)L$$

Thus, the polarization transmitted through the nonlinear birefringent medium is $$\Delta\phi = \left(k\Delta n - \frac{n_2 \omega}{c}I(t)(\cos^2\theta - \sin^2\theta)\right)L \quad (23)$$

which is a function of time and has a temporal dependence dependent upon the instantaneous power of the laser beam.

A desired distribution of laser beam pulse polarization may be obtained by choosing the laser peak power, the orientation of laser polarization relative to birefringence axes of the medium, the birefringence of the medium, the fiber length L and the pulse shape.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

The invention claimed is:

1. A polarimeter comprising:
a polarization modulator configured to change a polarization phase of a single optical pulse in accordance with a modulation function that varies in time over the duration of the single optical pulse to provide a single modulated optical pulse that varies in both linear polarization and circular polarization;
a polarization state analyzer comprising:
one or more static polarization component analyzers configured to receive the single modulated optical pulse after interaction with a target medium and provide a plurality of polarization components of the single modulated optical pulse; and
one or more optical detectors configured to sense time varying intensities of the plurality of polarization components of the received single polarization modulated optical pulse; and
a signal processing module configured to determine a polarization property of the target medium dependent upon time variations in the sensed intensities of the plurality of polarization components over the duration of the received single polarization modulated optical pulse, wherein the polarization property of the target medium comprises a portion of a full sixteen-element Mueller matrix that is sufficient to account for coupling between polarization n states.

2. The polarimeter of claim 1, wherein the polarization state analyzer further comprises an analog-to-digital converter configured to sample and digitize the sensed intensities of the plurality of polarization components to provide digitized intensities, and wherein the signal processing module is configured to determine the polarization property of the target medium dependent upon the digitized intensities.

3. The polarimeter of claim 1, wherein the single optical pulse comprises a laser beam pulse and wherein the polarization modulator comprises:
an electro-optic polarization phase retarder; and
a voltage generator configured to supply a control voltage to the electro-optic polarization retarder, wherein the control voltage varies in time over the duration of the laser beam pulse.

4. The polarimeter of claim 3, wherein the control voltage is varied over multiple full-wave voltages such that a phase retardation of the electro-optic polarization phase retarder is varied over multiple cycles of phase.

5. The polarimeter of claim 3, wherein the electro-optic polarization phase retarder comprises a Pockels cell.

6. The polarimeter of claim 1, wherein the signal processing module is further configured to:
    determine transit time of the single modulated optical pulse; and
    determine the polarization property of the target medium dependent in part on the transit time.

7. The polarimeter of claim 1, wherein the polarization state analyzer further comprises:
    a beam splitter configured to receive the single modulated optical pulse after interaction with the target medium and split the received single modulated optical pulse into first, second, and third split beams;
    wherein the plurality of polarization components comprise: horizontal, vertical, left-diagonal, right-diagonal, left-circular, and right-circular polarization components, and wherein the one or more static polarization component analyzers comprise:
        a first polarization component analyzer configured to receive the first split beam and to provide the horizontal and vertical polarization components of the received single polarization modulated optical pulse over the duration of the received single modulated optical pulse;
        a second polarization component analyzer configured to receive the second split beam and to provide the left-diagonal and right-diagonal polarization components of the received single modulated optical pulse over the duration of the received single polarization modulated optical pulse; and
        a third polarization component analyzer configured to receive the third split beam and to provide the left-circular and right-circular polarization components of the received single polarization modulated optical pulse over the duration of the received modulated optical pulse.

8. The polarimeter of claim 1, further comprising:
    a laser emitter, configured to emit a plurality of optical pulses that are modulated by the polarization modulator to provide a plurality of modulated optical pulses; and
    a beam scanner configured to scan the plurality of modulated optical pulses across at least a portion of the target medium.

9. The polarimeter of claim 1, wherein the polarization modulator comprises a Kerr non-linear optical element, wherein a polarization phase shift of the single optical pulse is dependent upon an amplitude of the single optical pulse.

10. The polarimeter of claim 1, wherein the single optical pulse comprises a polarized optical pulse having a duration of no more than 100 milliseconds.

11. The polarimeter of claim 1, wherein the single optical pulse comprises a polarized optical pulse having a duration of no more than 100 nanoseconds.

12. The polarimeter of claim 1, wherein the single optical pulse comprises a polarized optical pulse having a duration less than 10 times a propagation time from the polarization modulator to the polarization state analyzer.

13. A polarimeter comprising:
    a polarization modulator configured to change a polarization phase of a single optical pulse to provide a single modulated optical pulse that varies in both linear polarization and circular polarization;
    a polarization state analyzer comprising:
        a plurality of static polarization component analyzers configured to receive the single modulated optical pulse after interaction with a target medium and provide a plurality of polarization component optical pulses of the single modulated optical pulse;
        a time-division optical multiplexer configured to combine the plurality of polarization component optical pulses to a single time-multiplexed signal comprising a plurality of optical pulses that are separated in time;
        an optical detector configured to sense the time-multiplexed signal;
        an analog-to-digital converter configured to convert the sensed time-multiplexed signal to a digital signal; and
    a signal processing module configured to determine a polarization property of the target medium dependent upon the digital signal and upon the polarization phase of the modulated optical pulse, wherein the polarization property of the target medium comprises a portion of a full sixteen-element Mueller matrix that is sufficient to account for coupling between polarization states.

14. The polarimeter of claim 13, wherein the time-division optical multiplexer comprises a plurality of optical delay elements and one or more optical couplers.

15. The polarimeter of claim 13, wherein the signal processing module is further configured to:
    determine transit time of the single modulated optical pulse; and
    determine the polarization property of the target medium dependent in part on the transit time.

16. A method for sensing polarization properties of a target medium, comprising:
    receiving a single optical pulse that is outgoing from the target medium, the received single optical pulse resulting from interaction of a single transmitted optical pulse which varies in both linear polarization and circular polarization, with the target medium;
    passing the received single optical pulse through a plurality of static polarizers to provide a plurality of polarization components;
    sensing intensities of the plurality of polarization components over a duration of the received optical pulse; and
    determining the polarization properties of the target medium dependent upon time variations of the sensed intensities of the plurality of polarization components over the duration of the received optical pulse,
    wherein a polarization phase of the single transmitted optical pulse is modulated in accordance with a modulation function that varies in time over the duration of the transmitted optical pulse,
    wherein determining the polarization properties of the target medium is further dependent upon the polarization phase of the single transmitted optical pulse, and
    wherein the polarization property of the target medium comprises a portion of a full sixteen-element Mueller matrix that is sufficient to account for coupling between polarization states.

17. The method of claim 16, wherein sensing intensities of the plurality of polarization components over a duration of the received single optical pulse comprises digitizing the sensed intensities at a plurality of sample times over the duration of the received optical pulse.

18. The method of claim 16, wherein determining the polarization properties of the target medium is further dependent upon calibration parameters, the method further comprising:
   determining the calibration parameters from sensed intensities when the target medium is absent.

19. The method of claim 16, wherein determining the polarization properties of the target medium is further dependent upon calibration parameters, the method further comprising:
   determining the calibration parameters from sensed intensities when the target medium comprises a calibration medium with known polarization properties.

20. The method of claim 16, wherein the plurality of polarization components comprise vertical, horizontal, left-diagonal, right-diagonal, left-circular and right-circular polarization components, and wherein passing the received optical pulse through the plurality of polarizers to provide the plurality of polarization components comprises:
   passing the received optical pulse through a beam splitter to provide first, second and third split beams;
   passing the first split beam through a first polarizer to provide the horizontal and vertical polarization components;
   passing the second split beam through a second polarizer to provide the left-diagonal and right-diagonal polarization components; and
   passing the third split beam through a third polarizer to provide the left-circular and right-circular polarization components.

21. The method of claim 16, wherein the plurality of polarization components comprise a plurality of polarized optical pulses, the method further comprising:
   time-division multiplexing the plurality of polarized optical pulses to form a single multiplexed signal comprising a plurality of optical pulses that are separated in time,
wherein sensing intensities of the plurality of polarization components over a duration of the received optical pulse comprises sensing the intensity of the single multiplexed signal.

22. The method of claim 16, wherein the duration of the optical pulse no longer than the round trip propagation time of the optical pulse.

23. The method of claim 16, wherein determining the polarization properties of the target medium comprises cross-correlating the plurality of polarization components with delayed polarization components of the transmitted optical pulse over the duration of the received optical pulse, wherein the polarization components of the transmitted optical pulse are delayed an amount equal to an estimated roundtrip propagation time of the optical pulse.

24. The method of claim 23, further comprising:
   for a plurality of propagation times;
      calculating the polarization components of the received optical pulse from the polarization properties of the target medium and the propagation time; and
      calculating a difference between the estimated the polarization components and the sensed intensities of the plurality of polarization components over a duration of the received optical pulse;
   selecting the estimated roundtrip propagation time of the optical pulse to be the propagation time that minimizes the difference between the estimated polarization components and the sensed intensities of the plurality of polarization components over a duration of the received optical pulse; and
   determining the polarization properties of the target medium dependent upon the selected estimated roundtrip propagation time.

25. The method of claim 16, further comprising:
   determining transit time of the single modulated optical pulse; and
   determining the polarization property of the target medium dependent in part on the transit time.

* * * * *